United States Patent [19]

Traut

[11] 4,161,184

[45] Jul. 17, 1979

[54] LINEAR ROLLING CONTACT VALVES

[76] Inventor: Earl W. Traut, 8040 Palm Lake Dr., Orlando, Fla. 32811

[21] Appl. No.: 822,093

[22] Filed: Aug. 5, 1977

Related U.S. Application Data

[62] Division of Ser. No. 710,797, Aug. 2, 1976, Pat. No. 4,056,292.

[51] Int. Cl.² ............................................. G05D 11/03
[52] U.S. Cl. ..................................... 137/98; 137/111; 137/118; 251/DIG. 2
[58] Field of Search ................. 251/DIG. 2; 137/100, 137/111, 118, 98

[56] References Cited

U.S. PATENT DOCUMENTS

| | | | |
|---|---|---|---|
| 2,784,740 | 3/1957 | Stageberg | 251/DIG. 2 |
| 2,870,776 | 1/1959 | Marsh | 137/111 |
| 3,362,633 | 1/1968 | Freeman | 137/111 |
| 3,605,546 | 9/1971 | Klann | 251/DIG. 2 |
| 3,726,313 | 4/1973 | Pandya | 251/DIG. 2 |
| 3,773,077 | 11/1973 | Barnebey | 251/DIG. 2 |
| 3,951,377 | 4/1976 | Milroy | 251/DIG. 2 |

FOREIGN PATENT DOCUMENTS 1650394  8/1970  Fed. Rep. of Germany .... 251/DIG. 2

*Primary Examiner*—Martin P. Schwadron
*Assistant Examiner*—H. Jay Spiegel

[57] ABSTRACT

Linear motion fluid-actuated valves in which all elements are in rolling contact. Two major rollers are prevented from moving apart by a retainer belt, a separator roller depressing the belt between the two major rollers to prevent them from moving towards each other; two inner, opposite sides of the rectangularly cross sectioned valve-body holding the separator roller in position with respect to the retainer belt, the other two sides being in contact with the ends of the assembly of movable elements. Admission of fluid into an end of the valve body causes the assembly to move and thus expose a port in the valve body. Accumulators, pressure relief valves and fluid flow control valves are among the useful applications.

2 Claims, 2 Drawing Figures

LINEAR ROLLING CONTACT VALVES

This is a division of application Ser. No. 710,797, filed Aug. 2, 1976, U.S. Pat. No. 4,056,292.

BACKGROUND OF THIS INVENTION

1. Field of the Invention

This invention relates to that class of valves involving elements which move in a linear direction in rolling contact.

2. Description of the Prior Art

Most linear motion valves in use today utilize sliding cylinders, sleeves or other sliding elements which may include substantial sliding friction.

SUMMARY OF THIS INVENTION

This invention relates to a linear rolling contact valve. A flexible belt surrounds the two major rollers and is in rolling contact with an interposed roller, all four elements having the same axial dimension and rolling inside a close-fitting rectangular tube. The four elements fill the entire cross-section of the tube, and may be used as a fluid actuated valve, pressure relief valve, or accumulator.

It is a further object of my invention to provide a rolling contact linear fluid-actuated valve.

These and other objects, features and advantages will be more apparent from a study of the appended drawings in which.

DETAILED DESCRIPTION

Figure 1:
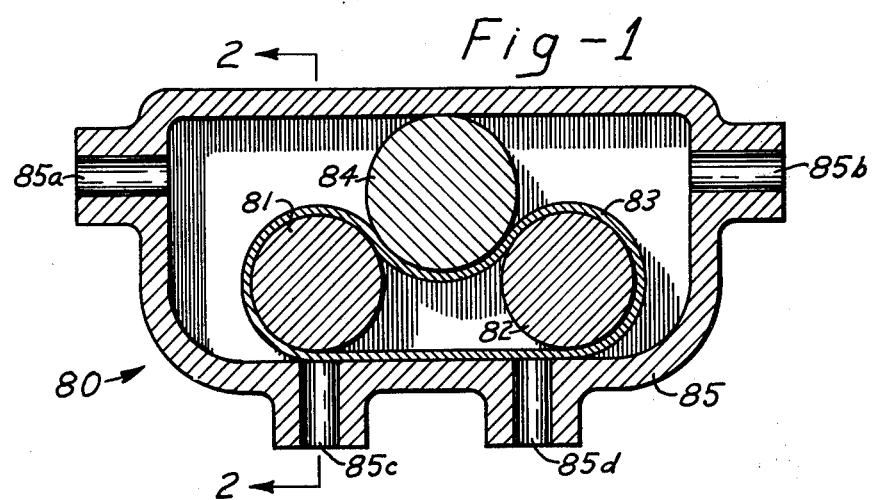
FIG. 1 is a cross-sectional view of a linear rolling contact fluid valve which utilizes three rollers and an endless belt surrounding the two major rollers, all installed in a housing having a rectangular cross-section.
Figure 2:
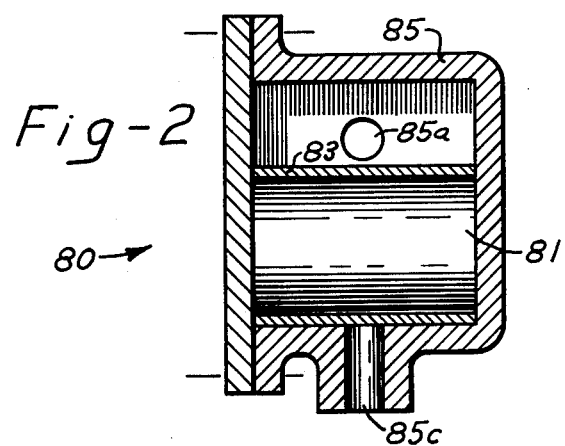
FIG. 2 is a cross sectional view of FIG. 1 taken along lines 2—2 and looking in the direction of the arrows.

FIGS. 1-2, linear rolling-contact fluid-actuated valve 80 is shown. Major rollers 81 and 82 are prevented from moving away from each other by endless belt 83, and from moving towards each other by separating roller 84. Valve body 85 has a rectangular cross-section which contacts the axial ends of elements 81, 82, 83 and 84 at its sides to prevent fluid leakage there-past. Valve 80 may be used to maintain equal pressure between two separate fluids which are connected to inlets 85a and 85b, as illustrated. If the pressure of fluid at inlet 85a is greater that that at inlet 85b, the assembly of elements 81 through 84 will move to the right, exposing pressure relief port 85c, which will permit fluid to escape, thus tending to equalize pressure at inlets 85a and 85b. If fluid pressure at inlet 85b is greater than at inlet 85a, fluid will similarly escape through port 85d.

In FIGS. 1-2, if inlet 85b and port 85d are blocked off and gas under pressure or a spring is placed in the right side of valve body 85, valve 80 becomes a pressure relief valve. If port 85c is additionally blocked off, an accumulator is described.

I claim:

1. A linear rolling contact valve comprising:
   a valve-body,
   said valve-body having a rectangular internal cross section,
   two major rollers,
   a circular retainer belt,
   said retainer belt being in a surrounding relationship to said major rollers, in rolling contact with same, and serving to prevent said major rollers from moving away from each other,
   said retainer belt being adjacent an inner side of said valve-body,
   a separator roller,
   said separator roller being in rolling contact with said retainer belt and with the inner side of said valve-body opposite the first named side,
   said separator roller serving to depress said retainer belt between said major rollers to prevent same from moving towards each other,
   said major rollers, said retainer belt and said separator roller comprising an assembly which can move inside said valve-body,
   the other two inner sides of said valve-body being adjacent the axial ends of said assembly so as to prevent fluid leakage therepast,
   two end walls,
   said end walls serving to close the ends of said valve-body,
   an opening into at least one end portion of said valve body, flow of fluid through said opening causing linear movement of said assembly with respect to said valve-body.

2. The linear rolling contact valve as claimed in claim 1 in which an opening is included in each of said end walls and in which two ports are included in first named inner side of said valve-body, so that differential pressure of fluids exposed to said two openings can cause said assembly to move in a direction which will permit fluid of higher pressure to exit via one of said two ports.

* * * * *